United States Patent
Zalewski

(10) Patent No.: US 9,584,862 B2
(45) Date of Patent: *Feb. 28, 2017

(54) METHOD AND APPARATUS FOR REAL-TIME VIEWER INTERACTION WITH A MEDIA PRESENTATION

(71) Applicant: Sony Computer Entertainment America LLC, San Mateo, CA (US)

(72) Inventor: Gary M. Zalewski, Piedmont, CA (US)

(73) Assignee: SONY INTERACTIVE ENTERTAINMENT AMERICA LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/558,592

(22) Filed: Dec. 2, 2014

(65) Prior Publication Data
US 2015/0143417 A1    May 21, 2015

Related U.S. Application Data

(63) Continuation of application No. 12/419,248, filed on Apr. 6, 2009, now Pat. No. 8,904,430.
(Continued)

(51) Int. Cl.
*H04N 21/478* (2011.01)
*A63F 13/30* (2014.01)
(Continued)

(52) U.S. Cl.
CPC ......... *H04N 21/4781* (2013.01); *A63F 13/12* (2013.01); *A63F 13/338* (2014.09);
(Continued)

(58) Field of Classification Search
CPC ........... H04N 21/4622; H04N 21/4725; H04N 21/4781
(Continued)

(56) References Cited

U.S. PATENT DOCUMENTS 5,708,845 A    1/1998   Wistendahl et al.
7,631,327 B2*  12/2009  Dempski .............. H04N 5/4401
                                                725/32

(Continued)

FOREIGN PATENT DOCUMENTS

JP    H11512902 A    11/1999
JP    2005100053 A   4/2005
(Continued)

OTHER PUBLICATIONS

Australian Office Action for AU Application No. 2009238476, dated Jun. 23, 2011.

(Continued)

*Primary Examiner* — Olugbenga Idowu
(74) *Attorney, Agent, or Firm* — Joshua D. Isenberg; JDI Patent

(57) ABSTRACT

Real-time participation within a media presentation is disclosed. A participant overlay may be generated by preprocessing a media presentation to extract a time-variant metadata stream associated with one or more interactive regions depicted in the media presentation. The participant overlay includes simulated physics, which may include boundaries of the interactive regions defined in accordance with content in said media presentation. A participant's interaction with said media presentation through the interactive regions may be captured and combined with the media presentation for display on a display. The interaction may comprise a user action upon one or more elements in the media presentation, a user action expressed in the media presentation through an avatar, or a user action in said media presentation in connection with a game element.

20 Claims, 5 Drawing Sheets

Related U.S. Application Data

(60) Provisional application No. 61/047,737, filed on Apr. 24, 2008.

(51) Int. Cl.

| | | |
|---|---|---|
| *H04N 5/445* | (2011.01) | |
| *H04N 21/462* | (2011.01) | |
| *H04N 21/4725* | (2011.01) | |
| *A63F 13/63* | (2014.01) | |
| *A63F 13/42* | (2014.01) | |
| *A63F 13/338* | (2014.01) | |

(52) U.S. Cl.
CPC .............. *A63F 13/42* (2014.09); *A63F 13/63* (2014.09); *H04N 5/445* (2013.01); *H04N 21/4622* (2013.01); *H04N 21/4725* (2013.01); *A63F 2300/409* (2013.01); *A63F 2300/69* (2013.01)

(58) Field of Classification Search
USPC .................................. 725/32, 34, 36, 42, 51
See application file for complete search history.

(56) References Cited

U.S. PATENT DOCUMENTS

| | | | |
|---|---|---|---|
| 7,959,511 B2 | 6/2011 | Kouno | |
| 8,202,167 B2* | 6/2012 | Ackley | A63F 13/10 463/31 |
| 8,904,430 B2 | 12/2014 | Zalewski | |
| 2003/0028873 A1* | 2/2003 | Lemmons | H04N 7/17318 725/36 |
| 2003/0101450 A1 | 5/2003 | Davidsson et al. | |
| 2004/0025190 A1 | 2/2004 | McCalla | |
| 2004/0189701 A1 | 9/2004 | Badt | |
| 2007/0260984 A1 | 11/2007 | Marks et al. | |
| 2008/0141326 A1* | 6/2008 | Thompson | A63F 13/12 725/118 |
| 2008/0307473 A1* | 12/2008 | Allen | A63F 13/12 725/104 |

FOREIGN PATENT DOCUMENTS

| | | | |
|---|---|---|---|
| JP | 2006014874 A | 1/2006 | |
| JP | 2006277076 A | 10/2006 | |
| JP | 2007226576 A | 9/2007 | |
| JP | 2007526657 A | 9/2007 | |
| JP | 2008040800 A | 2/2008 | |
| JP | 2008183053 A | 8/2008 | |
| KR | 20010000785 A | 1/2001 | |
| WO | 9900163 A | 1/1999 | |
| WO | 2006065005 A1 | 6/2006 | |

OTHER PUBLICATIONS

B. Burrill, T. Kirste, J. Weiss, "Time-varying Sensitive Regions in Dynamic Multi-Media Objects: a pragmatic approach to content-based retrieval from video." Information and Software Technology, vol. 36, No. 36, pp. 213-223 (1994).

Co-Pending U.S. Appl. No. 12/419,248, to Gary M. Zalewski, filed Apr. 6, 2014.

Co-Pending U.S. Appl. No. 61/047,737, to Gary M. Zalewski, filed Apr. 24, 2008.

Final Office Action for U.S. Appl. No. 12/419,248, dated Oct. 1, 2012.

Final Office Action for U.S. Appl. No. 12/419,248, dated Oct. 2, 2013.

International Search Report and Written Opinion for International Application No. PCT/US2009/040076, dated Nov. 19, 2009.

Japanese Office Action for JP Application No. 2011-506351, dated Apr. 2, 2013.

Japanese Office Action for JP Application No. 2011-506351, dated Feb. 18, 2014.

Non-Final Office Action for U.S. Appl. No. 12/419,248, dated Apr. 13, 2012.

Non-Final Office Action for U.S. Appl. No. 12/419,248, dated Mar. 24, 2014.

Non-Final Office Action for U.S. Appl. No. 12/419,248, dated May 9, 2013.

Notice of Allowance for U.S. Appl. No. 12/419,248, dated Aug. 15, 2014.

EPO Search Report for EP Application No. 09735853.5, dated Jan. 26, 2016.

* cited by examiner

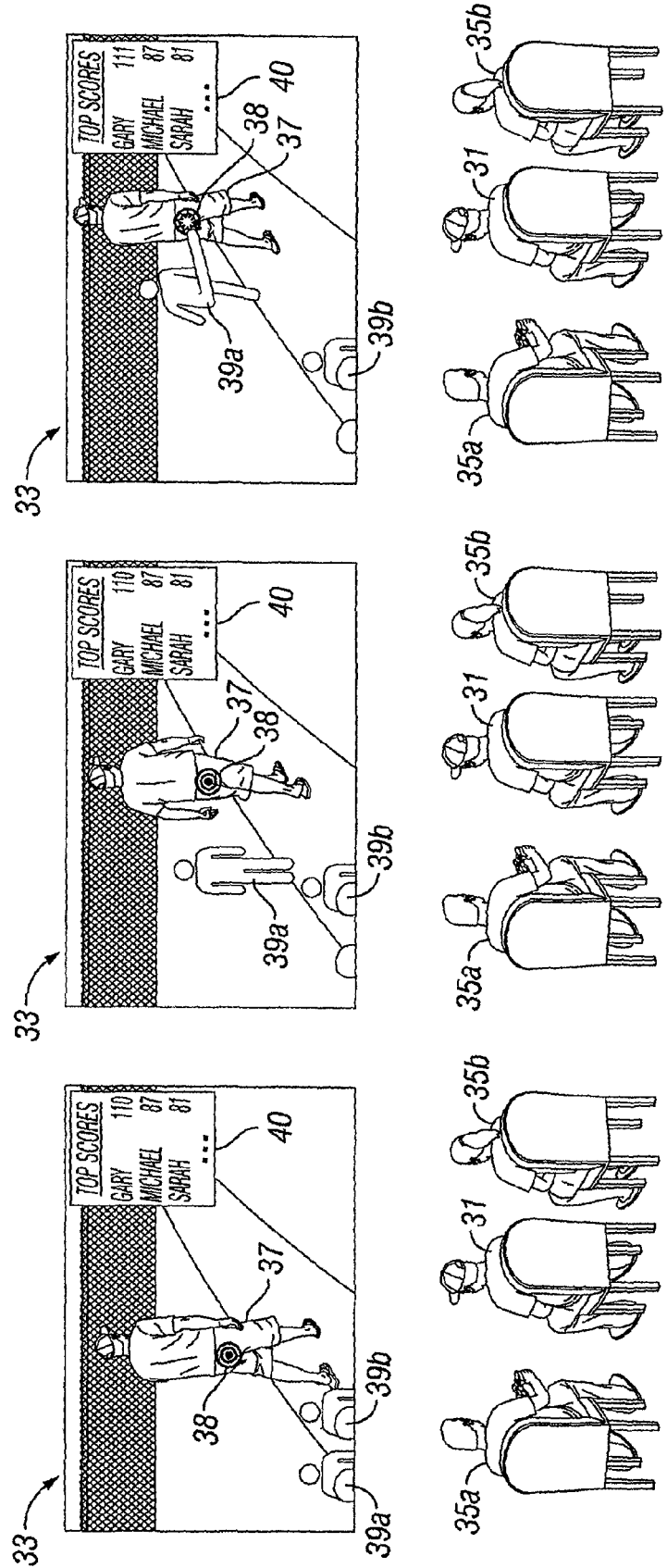

METHOD AND APPARATUS FOR REAL-TIME VIEWER INTERACTION WITH A MEDIA PRESENTATION

CLAIM OF PRIORITY

This application is a continuation of U.S. patent application Ser. No. 12/419,248, filed Apr. 6, 2009, the entire contents of which are incorporated herein by reference. U.S. patent application Ser. No. 12/419,248 claims the priority benefit of U.S. Provisional Patent Application No. 61/047,737, to Gary M. Zalewski, filed Apr. 24, 2008 and entitled System and "Method For Converting a TV Show Or Movie into an Interactive Game Experience", the entire contents of which are incorporated herein by reference. This application likewise claims the priority benefit of U.S. Provisional Application No. 61/047,737.

FIELD OF THE INVENTION

Embodiments of the invention relate to collaborative viewing of a media presentation. More particularly, embodiments of the invention relate to converting a media presentation, such as television show or movie into an interactive game experience.

BACKGROUND OF THE INVENTION

An annoying aspect of seeing a movie at a theater is distraction caused by conversations held between viewers during the presentation of the movie. It is not that conversation in and of itself is annoying so much as that it is someone else's conversation. On the other hand, it is enjoyable to share remarks, observations, and jokes with friends and family while watching a movie at home. To this end, a popular television series, Mystery Science Theater 3000, was based upon conversations that were held between viewers of a movie, typically an appallingly bad movie. In Mystery Science Theater 3000, two robots and a human space pilot commented and made jokes while the movie was presented. The movie was shown on a movie screen, as though in a movie theater, and the robots and human commentators appeared in silhouette, as though they were seated in the movie theater watching the movie.

It is known to provide players with the ability to talk to one another while playing a video game over a network. In fact, headsets are available for this purpose. As is known, players have a persona or avatar in such games that is a representation of the player. Thus, a player may participate in a game and talk with other players while doing so.

In the case of one or more individuals passively viewing a media presentation, such as a movie, there is no way to interact with the movie within the movie space itself. That is, those individuals viewing the movie cannot be a part of the presentation of the movie outside of offering up comments in their living room or in the movie theater. Simply put, they are not a part of the action on the screen. This is due, in part, to the fact that a media presentation, such as a movie, is static in that it exists with a beginning, middle, and end before it is presented to an audience.

In the case of a video game, players are participants in the unfolding drama of the game and cannot act as bystanders. This is due, in part, to the fact that a video game is dynamic in that the narrative of a video game is created in real-time as the players interact with the game.

B. Burrill, T. Kirste, J. Weiss, *Time-varying Sensitive Regions in Dynamic Muti-Media Objects: a pragmatic approach to content-based retrieval from video*, Information and Software Technology, Vol. 36, No. 36, pp. 213-223 (1994) describe a general concept for accessing the contents of the dynamic media by two points of view, i.e. those of hyper-media and information retrieval. Burrill et al. introduce the general concept of Sensitive Regions (or "hot-spots") by reverse engineering techniques from established technologies. Burrill et al. also describe three applications being developed which explore a variety of aspects associated with Sensitive Regions, i.e. the HyperPicture-System which manages such data, MOVie experiments with the creation of editing of Sensitive Regions in the cinematically oriented context, and Share ME which explores issues associated with the use of Sensitive Regions in the interface to multi-media applications.

D. Wistendahl, L. Chon, *System for mapping hot-spots in media content for interactive digital media programs*, U.S. Pat. No. 5,708,845 (13 Jan. 1998) disclose a system for allowing media content to be used in an interactive digital media program. Such system comprises Frame Data from the media content in object mapping data (N Data) representing the frame addresses and display location coordinates for objects appearing in the media content. The N Data are maintained separately from the Frame Data for the media content, such that the media content is kept in tact without embedded codes and can be played back on any system. The system establishes linkages connecting the object mapped by the N Data the other functions to be performed in conjunction with display of the media content. Selection of an object appearing in the media content with pointer results in initiation of the interactive function. Accordingly, a broad base of existing non-interactive media content, such as movies, videos, advertising, and television programming can be converted to interactive digital media use.

While the art provides a rudimentary scheme for interaction with media through various mapping techniques, there has been no attempt in the art to address the effects of such interaction, such that the interaction is coordinated with the content in a realistic way.

It would be advantageous to provide an experience in which one or more individuals could interact with a media presentation without previously being a part of the presentation itself.

SUMMARY OF THE INVENTION

The disadvantages associated with the prior art are overcome by embodiments of the present invention which are directed to a method and apparatus that allows real-time user interaction with a media presentation.

In an embodiment of the invention, users are enabled to interact with enhanced interactive productions of television shows or movies, based upon adding game overlays to such movies or television shows. In this way, the physics in the game or virtual world meet with the boundaries defined in the television show or movie set. For example, avatars displayed to a user, in response to user gestures in the real world, e.g. in response to manipulation of a game controller or other such expedient, may toss tomatoes that stick to the actor's face or bounce off the actor's face and roll along a table that appears in the movie or television show.

In an embodiment, the movie or television show may be preprocessed to extract a time-variant metadata stream associated with regions in the moving pictures. An overlay having both active regions and added content, such as animation, is composited with the movie or television show.

Such preprocessing can include both visual and/or aural components of the movie or television show.

User interaction with the enhanced movie or television show via a game controller or the like may be mapped to the movie or television show via the overlay, and game or other active features of the overlay respond during presentation of the movie or television show.

As a result, the audience can be brought into, and interact with, the performance depicted in the movie or television show. Such interaction may include, for example, individual user actions, such as throwing a tomato, as discussed above, or group and/or competitive actions, such as shooting a spider that is crawling on an actor's back.

BRIEF DESCRIPTION OF THE DRAWINGS

The teachings of the present invention can be readily understood by considering the following detailed description in conjunction with the accompanying drawings, in which:

FIGS. 3A-3C provide a series of block, schematic diagrams that show a prophetic example of user interaction with a media presentation through action of a user avatar within the presentation space according to another embodiment of the invention.

DESCRIPTION OF THE SPECIFIC EMBODIMENTS

Figure 1:
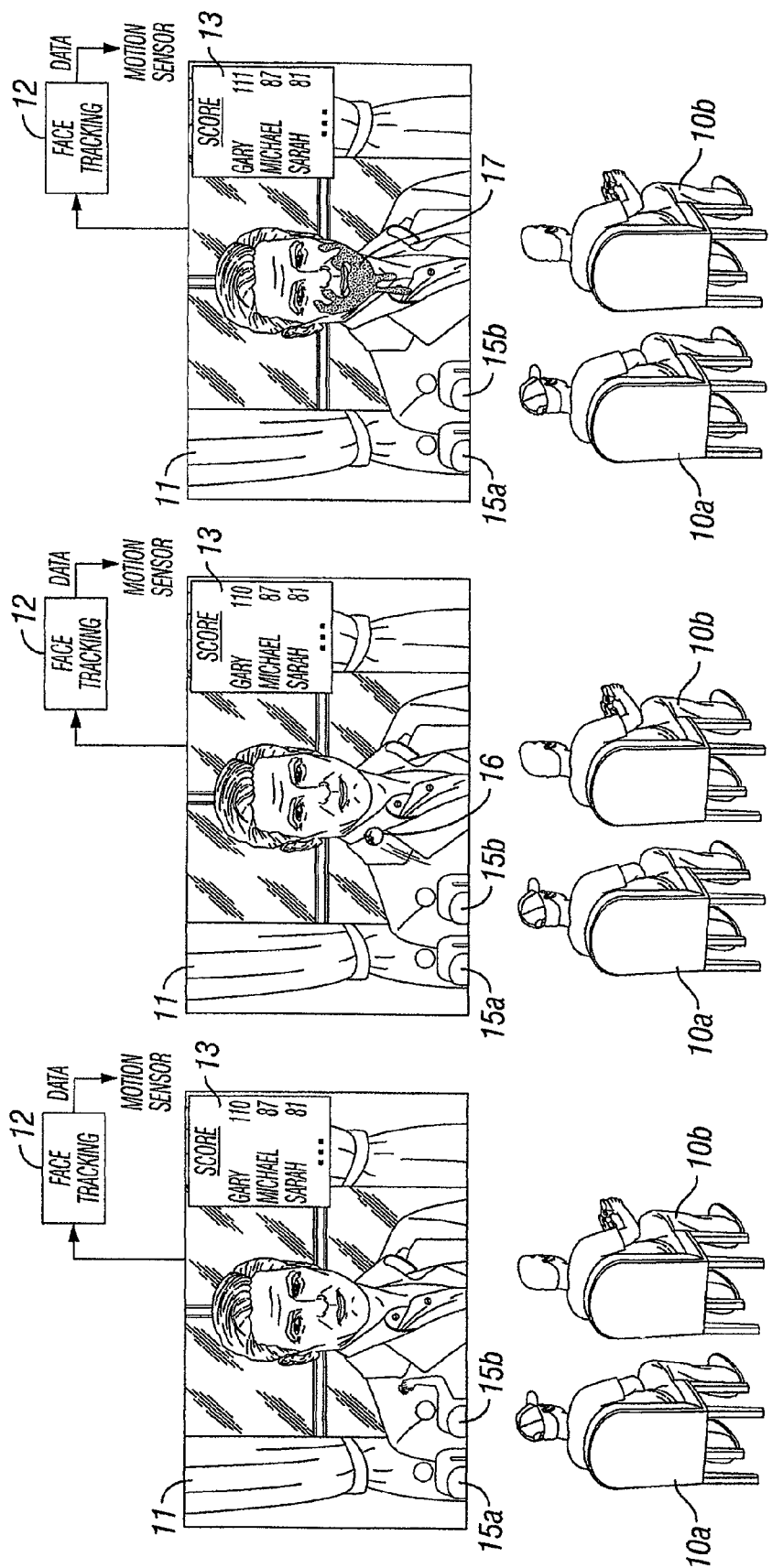
FIGS. 1A-1C provide a series of block, schematic diagrams that show prophetic examples of user interaction with a media presentation through manipulation of an object within the presentation space according to an embodiment of the invention.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

The disadvantages associated with the prior art are overcome by embodiments of the present invention which are directed to a method and apparatus that allows real-time user interaction with a media presentation.

In an embodiment of the invention, users are enabled to interact with enhanced interactive productions of media content, such as television shows or movies, based upon adding game overlays to such movies or television shows. In this way, the physics in the game or virtual world may include boundaries defined in terms of content elements of the television show or movie. For example, avatars displayed to a user, in response to user gestures in the real world, e.g. in response to manipulation of a game controller or other such expedient, may toss tomatoes that stick to the actor's face or bounce off the actor's face and roll along a table that appears in the movie or television show.

In an embodiment, the media content, e.g., a pre-existing movie or television show, may be preprocessed to associate a time-variant metadata stream with regions in the moving pictures. An overlay having both active regions and added content, such as animation, is composited with the movie or television show. Such preprocessing can include both visual and/or aural components of the movie or television show.

By way of example, the time variant metadata stream may be associated with the media content in the manner described in U.S. Pat. No. 5,708,845, which is incorporated herein by reference in its entirety. Specifically, frame data for a digitized version of the media, e.g., video, content, may be associated with object mapping data (N data) representing frame addresses and display location coordinates of objects appearing in the media content. An interactive digital media (IDM) program may be used to establish linkages connecting objects mapped by the N data to interactive functions to be performed in conjunction with display of the media content.

User interaction with the enhanced media content via a game controller or the like is mapped to the media content via the metadata overlay, and game or other active features of the overlay respond during presentation of the movie or television show.

As a result, the audience may be brought into, and interact with, the performance depicted in the media content. Such interaction may include, but is not limited to, for example, individual user actions, such as throwing a tomato, as discussed above, or group and/or competitive actions, such as shooting a spider that is crawling on an actor's back.

Figure 5:
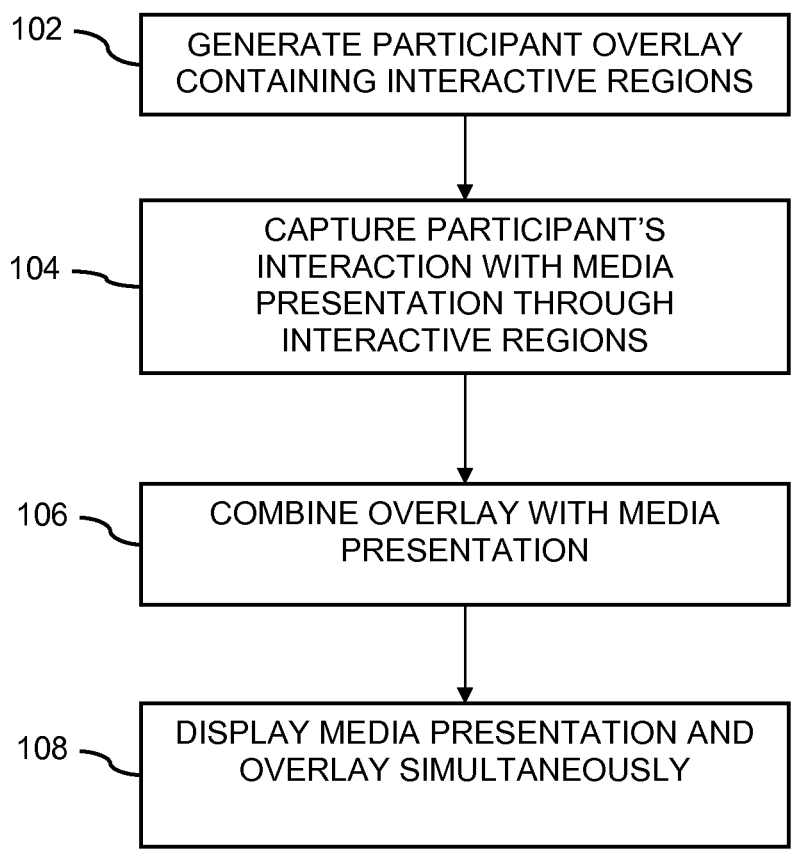
FIG. 5 is a flow diagram depicting a prophetic example of a method for real-time participation within a media presentation in accordance with an embodiment of the present invention.

FIG. 5 shows a flow diagram generally illustrating a prophetic example of a method 100 for real-time participation within a media presentation. The method 100 may be implemented in the form of a set of computer processor executable instructions, which may be embodied in a computer readable storage medium such as a hard disk, flash memory, CD-ROM, or random access memory (RAM). A participant overlay is generated as indicated at 102. By way of example the participant overlay may be generated by preprocessing a media presentation to extract a time-variant metadata stream associated with one or more interactive regions depicted in the media presentation. The participant overlay may include simulated physics. The simulated physics may include boundaries of the one or more interactive regions defined in accordance with content in the media presentation.

A participant's interaction with the media presentation through the one or more active regions is captured as indicate at 104. The interaction may comprise, e.g., a user action upon one or more content elements in said media presentation, a user action expressed in said media presentation through an avatar, or a user action in the media presentation in connection with a virtual object, such as a game element. The participant's interaction may be captured by way of a controller, such as a game controller, that is used in conjunction with a system used to display the media presentation and participant overlay. The overlay (including participant interactions) is combined with the media presentation for display to a participant on a display as indicated at 106. The media presentation and overlay may then be displayed simultaneously on the display as indicated at 108.

FIGS. 1A-1C provide a series of block, schematic diagrams that showing a prophetic example of user interaction with a media presentation through manipulation of an element within the presentation space according to an embodiment of the invention. FIGS. 1A-1C have in common an audience 10a,10b, which in this example comprises two audience members, each at a common location, and each having the ability to interact with a presentation of a movie or television show via a game controller. Those skilled in the art will appreciate that any number of individuals at any number of locations may comprise an audience, e.g. anywhere one person at one location to many individuals at many locations. Further, user interaction may take place with any or game controllers, motion sensing devices, and the like, and combinations thereof.

Further in common in FIGS. 1A-1C are a display 11 in which the audience is represented as avatars 15a, 15b; a score panel 13 which is displayed at least periodically in those embodiments of the invention that involve competition; and an object tracking module 12. In this embodiment, the object tracking module 12 provides data to a motion sensor 14 and thus enables actions of the audience in the real world to be represented in a temporal and physically correct manner in the presentation. By way of example, and not by way of limitation, the object tracking module 12 may additionally implement tracking of elements (e.g., objects or characters) within the media presentation. For example, the object tracking module may implement face tracking of the faces of one or more characters appearing in the media presentation to generate metadata (e.g., N data) associated with the tracked faces.

In an embodiment, the movie or television show may be preprocessed to extract a time-variant metadata stream associated with regions in the moving pictures. By way of example, a generator of the metadata stream, referred to herein as an author, may identify one or more elements in a particular frame of digital media content (or other media content that has been digitized) using an outlining tool in a video editing software such as ELASTIC REALITY 3™ from Avid Technology, Inc. of Tewksbury, Mass. If the element remains stationary throughout a number of succeeding frames, the author need not identify the element separately for each frame. Alternatively, if the element moves relative to the frame, a motion tracking or machine vision tool may be used to automatically identify the object in successive frames. An example of such a motion tracking tool is known as ASHET-2 developed by Stephen M. Smith at the U.K. Defense Research Agency, Chertsey, Surrey, UK. This program uses feature segmentation and clustering techniques to produce an abstracted representation of elements in successive frames of a video sequence. Using statistical comparisons, a cluster characterized by a similar set of features appearing at different positions in a path across a series of frames can be recognized as an element in motion. Once an element has been identified, a hyperlinking tool may be used to establish hyperlinks to the metadata to allow interaction with the elements.

To facilitate interaction between the audience members 15a, 15b and the elements in the media content, the display 11 may operate in conjunction with an interactive device, such as a computer or video game console device. Each audience member 15a, 15b may operate a conventional game controller to provide control signals to the interactive device. The interactive device may be configured to permit interaction with interactive objects presented on the display 11, e.g., through application-specific hardware or through software programming. The interactive objects may include elements (e.g., objects or characters) appearing in the media content that have associated metadata. Such elements are referred to herein as "content" elements. In addition, the interactive objects may include objects that are generated by the interactive device for the specific purpose of interacting with the content elements. Such objects are referred to herein as "virtual" objects.

In embodiments of the present invention, the metadata and/or interactive device may be configured to define one or more parameters of simulated physics that govern the interaction between virtual objects and content elements defined by the metadata. By way of example, and not by way of limitation, such physics parameters may include physical boundaries that define one or more regions of a scene presented on the display 11 that are subject to interaction. These physics boundaries may include vertical boundary surfaces, such as walls, or horizontal boundary surfaces, such as floors, ceilings, tabletops, and the like. These physics boundaries may be associated with corresponding content elements displayed in a scene shown on the display 11. By way of example and not by way of limitation, the physics boundaries may conform to the outline of a character depicted in the media presentation. The physics parameters may define the nature of interactions between virtual objects and the boundaries, e.g., the degree to which collisions between them are elastic or inelastic.

The physics parameters may also define relevant physical quantities governing the virtual objects. Specifically, the physics parameters may determine a direction and magnitude of the force of a gravity vector governing motion of virtual objects. The gravity vector may be oriented in any suitable fashion, e.g., parallel to the vertical edges of the frame or aligned with respect to the scene displayed in the frame. Furthermore, the physics parameters may define optical parameters of virtual objects, such as transparency, reflectivity, index of refraction and the like. In the case of solid virtual objects the physics parameters may include elasticity, plasticity, yield points, breaking strengths, and the like. In the case of virtual objects that simulate liquids the physics parameters may include density, viscosity, surface tension and the like.

The physics parameters may also define when and how a user may interact with a content element or interactive region shown on the display. For example, the physics parameters may define one or more regions of a scene or frame, referred to herein as "blackout" regions where interaction is prohibited. The parameters may also define one or more regions, referred to herein as "target" regions where interaction is expressly invited. Furthermore, the physics parameters may define regions of a scene, referred to herein as "free" regions, where virtual objects may appear and move.

As an example of interaction between a content element and a virtual object, audience member 10b may have a corresponding representation displayed on the display along with the media presentation in the form of an avatar 15b. As the audience member 10b operates his game controller to direct the avatar to lift its arm in the presentation, the avatar 15b can responds accordingly. In FIG. 1A, the audience member 10b operates a game controller to begin to throw a virtual tomato 16 at an actor in a movie or television show. The actor's face may be a content element having an associated metadata stream that permits interaction with the virtual tomato. As depicted in FIG. 1B, the audience member 10b may fling the virtual tomato 16 at the face of the actor and the tomato may be depicted in the presentation, as well as the throwing gesture of the avatar 15b for the audience member 10b.

As shown in FIG. 1C, the tomato may land on the actor's face and is drip 17 onto the actor's shirt and jacket. Metadata associated with the virtual tomato 16 and/or the actor may govern the physics of the smearing and dripping of the tomato. By way of example, if the throw by the audience member 10b is accurate, his score may be incremented. Thus, the score for Gary may be incremented to 111.

This embodiment, as shown for purposes of example in FIGS. 1A-1C, provides for user interaction with a media presentation through manipulation of an object within the presentation space. Any object can be manipulated relative to any portion of a presentation. The example of a user throwing a tomato at an actor's face is only one possibility of an almost infinite number of options. For example, a user may pick up a chair and break a window; a user may drive a car over a cliff, etc.

In some embodiments, the nature of the interactivity may be based on the nature of a content element of the media presentation. For example, more points may be awarded if a virtual tomato hits a character who is the "star" of the media presentation.

Figure 2:
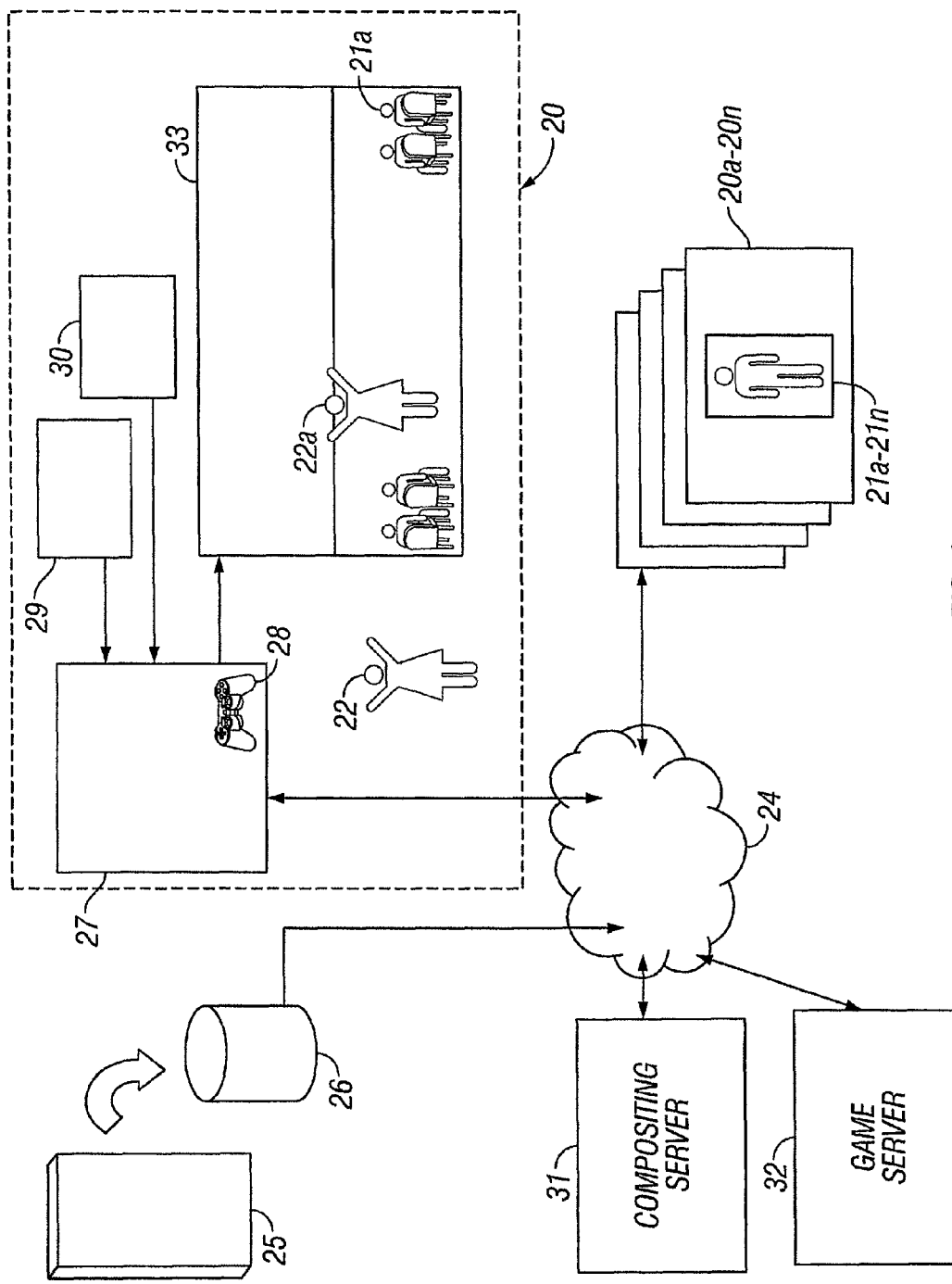
FIG. 2 is a block, schematic diagram illustrating a prophetic example of a system for real-time viewer interaction with a media presentation according to the invention.

Furthermore, virtual objects may serve a purpose that is ancillary to their interaction with the media presentation. For example, a virtual object may incorporate advertising information, which can be displayed on the display. Such virtual objects are sometimes referred to herein as "brand name" objects FIG. 2 is a block schematic diagram of a system for real-time viewer interaction with a media presentation according to an embodiment of the invention. FIG. 2 provides an example of an embodiment in which each participant is interconnected via a network 24, such as the Internet. Other embodiments do not need a network connection and may be entirely local, as will be discussed below. In FIG. 2, several participant locations 20 and 20a-20n are shown, which provide facilities for their respective users 22 and 21a-21n. By way of example, and not by way of limitation, participant location 20 may include a television or other type of display 33. The participant at this location 20 may interact with the system, e.g., by means of a game controller 28, microphone 29, and video camera 30. Embodiments of the invention contemplate other forms of user interaction as well, such as a cell phone, where the interaction takes place, for example, amongst theater goers in a movie theater. The interaction of the participant is captured at a local processor 27, which may be implemented by a general-purpose computer or other device having a computer processor. By way of example, the local processor 27 may be implemented in a game console, such as a Sony PlayStation 3.

Each participant location may be interconnected via the network 24 with a game server 32 and a compositing server 31. The game server 32 may be provided in those embodiments that provide game play features, as discussed below. The compositing server 31 provides an overlay OL onto a media presentation MP that allows interactive features to be added to such media presentations. In some implementations, the functions of both the game server 32 and the compositing server 31 may be combined in a single server device. Further, the game server and/or compositing server functions can be implemented at a participant's location, for example by the local processor 27. In this embodiment, a network is not necessary. However, the inclusion of a network provides interaction from a plurality of participants at a plurality of remote locations simultaneously and in real time.

A media server 26 may provide content 25 corresponding to the media presentation MP to the compositing server 31. Alternatively, the content 25 may be provided through other means. For example, the content 25 may be embodied in a computer readable medium such as a digital video disk (DVD), CD-ROM, universal serial bus (USB) flash drive and the like and accessed by the local processor 27 through an appropriate interface, e.g., a DVD player, CD-ROM drive or USB port. The compositing server 31 combines the participant interactions with the media presentation corresponding to the content 25 in real time. Time codes and other known synchronization techniques may be used to assure accurate registration of user interactions with the media presentation, and may also be used to map the media presentation, for example on a frame-by-frame or scene basis, to add elements to the media presentation and to track user interactions on the basis of locations within the media presentation. For example, a mapping may be used to track user movement of objects, shooting, avatars, and the like in the overlay in accurate registration with the underlying media presentation MP. Such techniques as collision detection and the like, as are well known to game developers of ordinary skill in the art, may be applied to implement these features.

As shown in FIG. 2, the media presentation 25 may appear on a participant's display 33 as a video presentation. Likewise, avatars for the various participants 21 and 22 are also shown on the screen as avatars 21a and 22a. Actions of the participants are shown in a similar way. Also note that FIG. 2 shows a split screen, in which the media presentation appears in an upper portion of the screen and the participants appear in a lower portion of the screen. This convention is not required, and the overlay may be generated as desired, e.g. over the entire screen.

Accordingly, an embodiment of the invention overlays an interactive element onto a media presentation in real time, i.e. while it is playing. In one embodiment, a scene or other narrative element is presented as part of the media presentation. The scene or narrative element may be a scene from existing content, such as a movie, television show, music video, sporting event, or the like; it may be a prepared piece of content for use in connection with the interactive system described herein; or it can be a video game or other interactive activity, e.g. where spectators to a video game may interact with the game play as an audience. While the foregoing example mentions that a scene is presented, embodiments of the invention contemplate that an entire movie, for example, may be presented. By way of example, and not by way of limitation, the media presentation may comprise a standard cable or satellite broadcast, over-the-air digital or analog terrestrial broadcast, streamed media, DVD, or Blu-ray presentation as a content source.

FIGS. 3A-3C provide a series of block, schematic diagrams that show user interaction with a media presentation through action of a user avatar within the presentation space according to another embodiment of the invention. In the example of FIGS. 3A-3C, a scene presented on a display 33 shows an actor 37 walking along a sidewalk. An interactive layer is composited with the scene to superimpose a target 38 on the actor's behind that is visible to all individuals who are participating in an interactive, real time viewing session. In one example, the display 33 shows the content scene and the target, as well as all members in an audience, for example, in a theater watching the scene, including those members of the audience 35a, 35b who are interacting with the presentation. In this example, one member of the audience 31 is passively viewing the presentation. The target provides a game element and cues the audience to take some action. For example, each interacting member of the audience could throw a virtual spitball at the screen that other participants could see (see the example described above in connection with FIGS. 1A-1C).

Each interacting member of the audience 35a, 35b may have a corresponding avatar 39a, 39b shown on the display 33 along with the presentation. As depicted in FIG. 3A, each interacting member of the audience may be shown with their corresponding avatar seated. As seen in FIG. 3B, an audience member 35a may use a game controller or other such mechanism to move his avatar 39a out of its seat in the presentation and to have the avatar walk up to the target. In the prophetic example shown in FIG. 3C, the avatar of the audience member 39a is now out of its seat, has rushed up to the actor in the scene, and has kicked the actor in the behind while the target is still displayed. The first participant to accomplish this may be awarded points. Total points are displayed in a ranking among the players 40. In this prophetic example, Gary has successfully completed this action and his score is incremented to 111. Alternatively, a player may be given some other acknowledgement, or could act solely for his, and everyone else's, entertainment.

Key to this embodiment of the invention is the adding of a representation of an audience member, e.g., in the form of an avatar, to the presentation. Enhancements to movies or television shows may be both overlaid and tied temporally and physically to the action within the presentation. In the example depicted in FIGS. 3A-3B, the target tracks the movement of the actor. Accordingly, in this example, the target appears to be static with respect to the actor's frame of reference; and the avatar moves within the presentation space in a realistic way, such that the avatar can be manipulated to match the actor's stride, or to run up to the actor as the actor is moving and, for example, kick the target.

In one embodiment, a system is provided that enables actions in connection with specific interactive objects at referential locations on a display, for example on a television or computer display. The locations for the interactive objects and the times at which they are presented during a particular media presentation may be predetermined so that presentation of the objects makes sense for that particular media presentation. For example, objects may be presented at any time during which user interaction would enhance the entertainment value of the media presentation, such as during a chase scene, during a love scene, during a fight, or as voted upon by the audience, for example, during a boring part of the media presentation, when the audience is restless. By way of example, and not by way of limitation, participants may signal their inattention by posting an icon resembling a popcorn box on the display. This is similar to going to the lobby in a movie theater. If a predetermined number of popcorn boxes are displayed, then interactive features are turned on.

Alternatively, the media presentation may be automatically enabled for overlay viewer interaction; or a palette of actions can be persistently displayed or user invoked, by which any viewer can add interactive elements to a media presentation. In this later case, the user may comment with a voice bubble, take an action, such as throwing an object, move and animate an avatar, display a reaction, such as approval or dislike, and so on.

As discussed above, boundaries can be applied that restrict the area of user interaction, for example to an audience. Further, each member of the audience may have a personal element, such as an avatar, so that they are recognized by other members of the audience. In another embodiment, metadata is provided that defines referential corners of an object. For example, the metadata may identify areas within the presentation, such as a person's behind, upon which a target would appear (see FIG. 3).

An embodiment of the invention allows, for example, a movie distributor to create a game for the movie. At some point in time during the movie, the game element is aware, for example, that there is a table at a particular location in the frame, or that a person is bending over. Metadata tells the system the boundary points of this element. Each participant that is receiving the movie thus knows which screen elements are active based upon the coordinates of the object in the frame. User interaction with the object may be tracked locally, for example, using a video game connected to the user's television and, optionally, to a network. The participant's interaction may be composited with the media presentation in real time and, based upon the coordinates of the object in the frame, the participant's actions may be merged into the frame and, alternatively, used to generate a score if the participant successfully performed a task, such as hitting a target or reacting before any other participant. This later case might be applied, for example, in a game such as Where's Waldo, in which the first participant to react to the appearance of a character or object would receive points.

Further, user interaction may be captured and used to prepare an analysis of the media presentation. For example, those scenes that were most engaging to the audience could be identified.

Figures 4A, 4B, 4C:
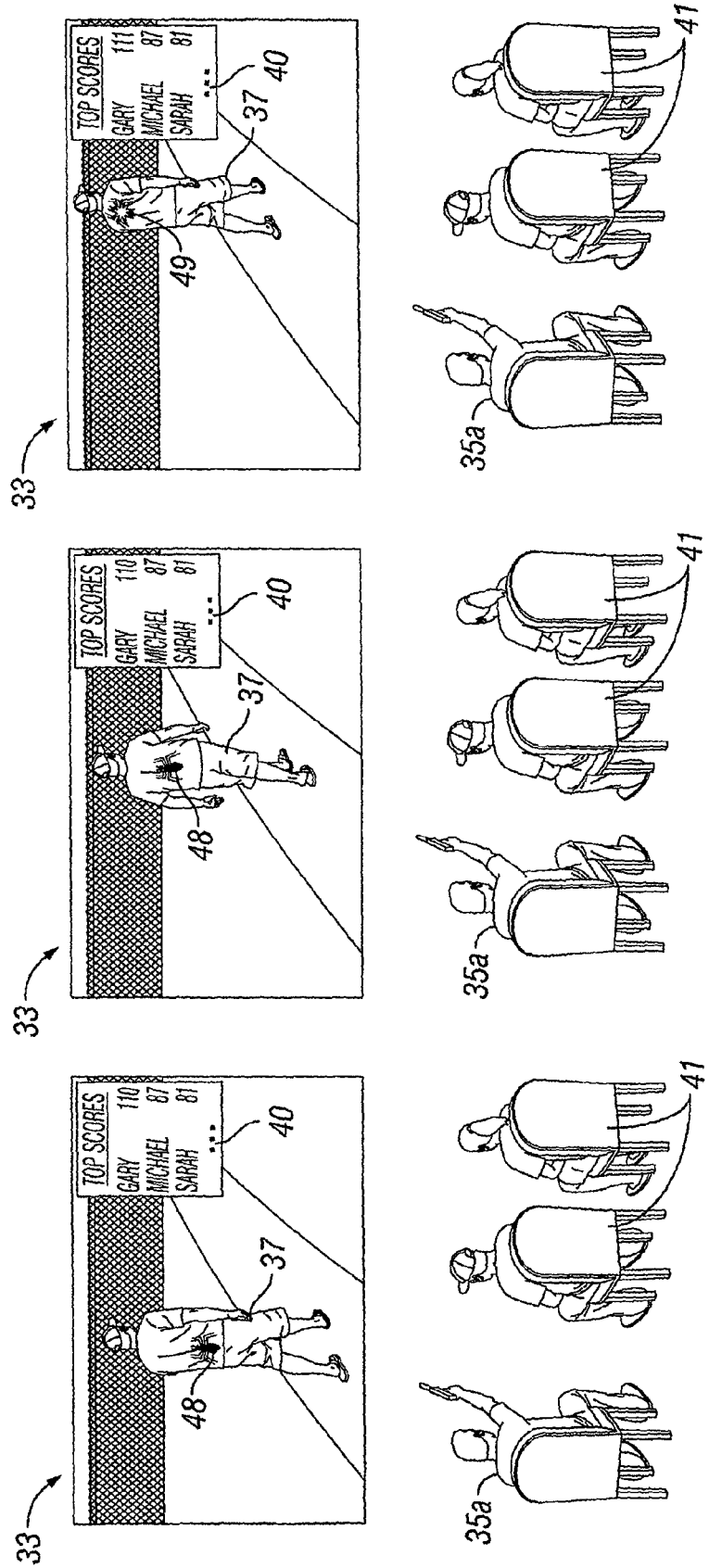
FIGS. 4A-4C provide a series of block, schematic diagrams that show prophetic examples of user interaction with a media presentation as part of a game that is appended to the media presentation within the presentation space according to the invention.

FIGS. 4A-4C provide a series of block, schematic diagrams that show user interaction with a media presentation as part of a game that is appended to the media presentation within the presentation space according to the invention. One example of this embodiment is a game implementation that provides a shooting game. For example, a metadata stream may add a virtual spider 48 to the narrative of a science-fiction or horror movie. The virtual spider may jump on an actor in the scene from time to time. When the virtual spider appears, it may begin crawling up the back of the actor on which it has landed. The metadata stream may be configured to realistically match motion of the spider to motion of the actor. Boundaries may be established that the spider cannot go beyond due to the presence of another object in the scene, such as a person, a book on the table, a glass, etc. The metadata stream may define references within the frame, which establish constraints within the time base of sequenced images where the game elements are overlaid and mixed in with the media presentation. In this example, participants can shoot at the virtual spider.

In some embodiments, the metadata stream may include an audio transcript that is time referenced to action taking place in the media presentation so that interactions with virtual objects may be triggered by events occurring in the media presentation. For example, the virtual spider may be triggered to jump if a character in the media presentation says "jump".

In the prophetic example shown in FIG. 4A, one audience member 35a has a game controller or other such device that is used to shoot at the spider. Other audience members 41 may passively view the presentation. As an actor 37 walks through a scene in the media presentation, the virtual spider 48 moves with the actor, and also moves up the actor's back to bite the actor in the neck. Progress of the spider may proceed as shown in FIG. 4B. In the prophetic example depicted in FIG. 4C, the audience member 35a has shot at the spider and hit it. This is indicated in this embodiment by the spider exploding 49. Because the spider was hit (and the actor spared the fate of having his neck bitten), the score 40 of the audience member is incremented. Thus, Gary's score is incremented to 111.

The media presentation may be viewed simultaneously by many people at many locations. At the same time, the participants are also playing a game. Each participant may be connected to the overlay generator by a network, such as the Internet. In another embodiment, an overlay of aliens may be displayed, the overlay generator may establish conditions and an environment upon which a game/film producer overlays the specific mini-interactive event, in this case the aliens may jump up and down on a table. As the participants attempt to shoot the aliens, the game server may track user actions and records participant scores, which are displayed both to each participant on his television, and which can also be displayed as a ranked list of the highest scoring participants. Animation is added to the overlay to show the effect of shooting each alien.

According to another embodiment an interactive piece may be added to a media presentation by repurposing existing content. For example, an interactive layer may be added to an existing movie, such as a war movie. The interactive layer may designate characters in the movie that are shootable, or shootable (virtual) characters may be added to the movie, as in the alien example above.

An embodiment provides an interactive participant score register in which participant interactions are kept. A participant's score and/or previous interaction may affect a subsequent segment of play. For example, if a participant killed an alien successfully, then the next alien might be a bigger monster that is harder to kill.

Another embodiment may provide an outline of the participants' avatars in a theater overlay, as discussed above. However, in this embodiment, the interactive aspect may be sponsored. For example, the overlay generator composites images of a sponsoring company's products, such as real Coca-Cola cans. The participants could take these cans and throw them at targets during interactive portions of the media presentation. The participant interaction and gestures may be based upon a suitable form of input. Examples of such input include, but are not limited to operation of a game controller, participant motions and gestures captured by a camera that is observing the participant, or sounds made by a participant and captured by a microphone. In this embodiment, the overlay may comprise a frame on the bottom of the screen with the audience depicted in the frame. Each participant may be represented by his avatar as a member of the audience depicted in the frame.

Participants who wish to interact with the media presentation may use a game controller or make a recognized gesture, e.g., trigger the throwing of a virtual object at a portion of media presentation. The participant's avatar may be depicted on the screen as throwing the virtual object into the media presentation depicted on the screen. In this prophetic example, since every participant's avatar is depicted in the frame, each participant can see every other participant's interaction with the scene, e.g., people throwing objects on the screen and trying to hit the target while watching. By way of example, participants may throw virtual tomatoes because they really do not like a certain scene. In this prophetic example, the number of tomatoes may be counted for each scene and this information may be provided as a report to a producer of the show, indicating that a particular scene was not popular, was popular, was engaging, etc. Thus, this embodiment may be useful for capturing demographic information with regard to a viewing audience.

As discussed above, a key aspect of certain embodiments of the invention is frame level physics-based interaction of a user with one or more objects in the media presentation. That is, users may be presented an overlay, such as a game overlay, and may interact with an underlying media presentation in a way that conforms to the laws of physics (or physics simulation). Thus, as in a previous example, a virtual tomato landing on the face of person depicted in the media presentation may create an impact in which the virtual tomato naturally deforms and splatters. Furthermore, the virtual tomato may then drip from the depicted person's face in a manner that is natural and realistic.

A further embodiment of the invention contemplates interaction of an element of a media presentation with a game element. In the prophetic example of the virtual tomato, the tomato hits the depicted person's face, but the depicted person's face is not necessarily deflected by the virtual tomato. In this further embodiment of the invention, the individual's face may be deflected.

To facilitate such interaction, embodiments of the invention may include a mechanism for extracting an element of an underlying media presentation and remapping an animated version of that element into the scene. In this regard, consider a prophetic example where the underlying media presentation is a vintage 1920's Charlie Chaplin film in which Charlie Chaplin is drinking from a clear glass that might contain water, all while he is walking around a set during the scene. In this embodiment, the individual is provided would be provided with the ability to use a joystick or other game controller to throw animated rubber ducks into the glass. Not only would the individual score points, should the duck land in glass, but the water in the glass would rise in volume as the ducks landed in the glass. Further, water might splash from the glass, and a duck landing on the edge of the glass, but still within the glass, might bounce from the side of glass into the water, displacing water appropriately. To accomplish this, the water originally depicted in the glass in the Charlie Chaplin film may be rendered, for example using wire frame or other animation techniques. The rendered object replaces the original object in the presentation, for example as part of the overlay. The overlay may track the original object as the object moves from frame-to-frame in the underlying media presentation. Thus, Charlie Chaplin would be walking around with a glass of water in which the water appears exactly as in the original presentation because it is a rendering of that water based upon the underlying image, but in which it has been modified to exhibit animated effects. Thus, an object may be introduced into a media presentation as part of a game overlay and that object may interact with another object that is part of the underlying media presentation as well. The object that is originally part of the media presentation, having been re-rendered in an interactive form, would not appear any differently than in the original presentation until such time as there is a user interaction with the object. Thus, as mentioned above in connection with the glass of water, a rubber duck landing into the water would both raise the level of the water in the glass and also cause water to splash from the glass.

Those skilled in the art will appreciate that this technique may be used in many different ways. For example, as mentioned above in connection with the example of a tomato being thrown at an individual, the blow of the tomato glancing off the individual's face may cause the individual's face to be displaced appropriately. In the example of an individual kicking a character in a presentation, the kicked individual may be displaced or the portion of the body that is kicked may respond. Key to this aspect of the invention is modeling the physics and the interaction of the impacting object, e.g. the duck and the underlying object, e.g. the water, in a way that is realistic. Known game technology techniques can be used to accomplish this modeling.

A key aspect to certain embodiments of the invention is the compositing of an interactive game layer over an existing piece of media content, and in this aspect of the invention, the replacement of some element of the media presentation with a version thereof that is capable of interacting in an animated and realistic fashion, based upon the physics of the interaction. In one embodiment of the invention an editor may repurpose selected portions of the underlying content to add metadata at the frame level that re-renders those portions which are intended to be active on the basis of the laws of physics. In a broader sense, this aspect of the invention applies metadata to a content presentation to define boundaries of objects in the video stream based on physics of the objects themselves. Thus, in another embodiment, advertising assets may be added to either overlaid objects as part of the game overlay, or as a replacement for objects in the underlying content presentation. For example, a box of cereal, which appears in a scene where a family is having breakfast, could be replaced with a box of cereal that is physically identical, but that includes an advertising logo of a cereal manufacturer. Similarly, a logo, such as the Nike logo, could be added to a pair of shoes. The invention would track movement of the individual as the individual walked or ran through the scene and apply the Nike logo in a realistic way.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

Throughout this description, the embodiments and examples shown should be considered as exemplars, rather than limitations on the apparatus and methods disclosed or claimed. Although many of the examples presented herein involve specific combinations of acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

As used herein, "plurality" means two or more.

As used herein, "and/or" means that the listed items are alternatives, but the alternatives also include any combination of the listed items.

What is claimed is:

1. A system for real-time participation within a media presentation, comprising:
    a compositing processor programmed to
    a) generate a participant overlay by preprocessing said media presentation to extract a time-variant metadata stream associated with one or more interactive regions depicted in said media presentation, wherein said participant overlay includes simulated physics, wherein said simulated physics include boundaries of said one or more interactive regions defined in accordance with one or more content elements in said media presentation;
    b) provide a range of actions with which a participant can augment the media presentation by adding one or more interactive elements to said media presentation;
    c) capture a participant's interaction with said media presentation through said one or more interactive regions of said overlay and said one or more interactive elements; and
    d) combine said overlay with said media presentation for display to said participant on a display.

2. The system of claim 1, wherein said participant's interaction comprises any of a user action upon said one or more content elements in said media presentation, a user action expressed in said media presentation through an avatar, or a user action in said media presentation in connection with a game element.

3. The system of claim 1, further comprising a display for simultaneously displaying said media presentation and said participant overlay.

4. The system of claim 3, further comprising a controller configured to facilitate the participant's interaction within said media presentation in real time.

5. The system of claim 4, said controller comprising:
    any of a game controller, joystick, mouse, touchpad, ultrasonic motion detector, microphone, and video camera.

6. The system of claim 1, further comprising:
    a plurality of participant locations, each participant location supporting at least one participant; and
    a network for interconnecting each participant location;
    wherein said compositing processor is configured to simultaneously capture interaction of each participant at each of said plurality of participant locations and add the interaction of each participant to said overlay in real time for display at a display at each of said participant locations.

7. The system of claim 1, further comprising a participant location comprising a facility that supports a plurality of participants and a display configured to display said media presentation and said participant overlay simultaneously to each of said plurality of participants.

8. The system of claim 7, further comprising means for each participant in said plurality of participants to interact with said media presentation in real time.

9. The system of claim 1, wherein said compositing processor comprises:
    a local processor at said participant location.

10. The system of claim 1, further comprising:
a game processor programmed to provide at least one game play element to said media presentation via said participant overlay.

11. The system of claim 10, wherein said game processor and said compositing processor comprise:
one or more local processor at said participant location.

12. The system of claim 1, further comprising:
a media processor programmed to provide said media presentation to said compositing processor.

13. The system of claim 1, wherein said compositing processor is further programmed to synchronize captured participant interaction with said media presentation.

14. The system of claim 1, wherein said compositing processor is further programmed to map said media presentation on a predetermined basis, to add interactive elements to said media presentation in accordance with said map, and to track participant interaction with said interactive elements based upon said map.

15. The system of claim 14, wherein said compositing processor is programmed to use said map to track participant movement of said interactive and to maintain accurate registration between said participant overlay and said media presentation.

16. The system of claim 1, wherein said participant overlay comprises:
an avatar representation of said participant, wherein the avatar representation is configured to interact with one or more of the interactive elements.

17. The system of claim 1, wherein said participant overlay comprises:
interactions of said participant with any of said media presentation and interactive elements within said participant overlay.

18. The system of claim 1, wherein at least one element of said media presentation is extracted therefrom and re-rendered into an interactive feature.

19. A method for real-time participation within a media presentation, comprising:

a) generating a participant overlay by preprocessing said media presentation to extract a time-variant metadata stream associated with one or more interactive regions depicted in said media presentation, wherein said participant overlay includes simulated physics, wherein said simulated physics include boundaries of said one or more interactive regions defined in accordance with one or more content elements in said media presentation;

b) providing a range of actions with which a participant can augment the media presentation by adding one or more interactive elements to said media presentation;

c) capturing a participant's interaction with said media presentation through said one or more interactive regions of said overlay and said one or more interactive elements; and d) combining said overlay with said media presentation for display to said participant on a display, said interaction comprising any of a user action upon said one or more content elements in said media presentation, a user action expressed in said media presentation through an avatar, or a user action in said media presentation in connection with a game element; and e) simultaneously displaying said media presentation and said overlay on the display.

20. A game system comprising:
a display; and
a processor coupled to the display, wherein the processor is configured to combine pre-existing video content with an interactive overlay that permits user interaction with one or more virtual objects overlaid onto a scene of the pre-existing video content, wherein said overlay includes simulated physics, wherein said simulated physics include boundaries defined in accordance with one or more content elements in said video content, and wherein the processor is configured to provide a range of actions with which a participant can augment a media presentation by adding one or more interactive elements to said video content.

* * * * *